United States Patent [19]
Hickey et al.

[11] Patent Number: 5,788,038
[45] Date of Patent: Aug. 4, 1998

[54] ANTI-GEAR-HOPPING DEVICE

[75] Inventors: John L. Hickey, Syracuse; Wesley M. Dick, Ft. Wayne, both of Ind.

[73] Assignee: Dana Corporation, Toledo, Ohio

[21] Appl. No.: 720,779

[22] Filed: Oct. 3, 1996

[51] Int. Cl.$^6$ ............................................. F16D 25/061
[52] U.S. Cl. .................... 192/86; 192/85 CA; 192/85 V; 192/88 A; 475/127; 475/138; 475/143; 475/295
[58] Field of Search ........................ 475/116, 119, 475/121, 128, 138, 143, 146, 295, 133, 127, 237, 256; 192/85 CA, 85 V, 86, 88 A

[56] References Cited

U.S. PATENT DOCUMENTS

| | | | |
|---|---|---|---|
| 3,682,014 | 8/1972 | Magg et al. | 74/336 |
| 4,555,959 | 12/1985 | Braun | 74/334 |
| 4,577,741 | 3/1986 | Schmid | 192/85 V |
| 4,960,192 | 10/1990 | Kurihara | 192/85 V |
| 4,974,474 | 12/1990 | Newbigging | 74/867 |
| 5,044,216 | 9/1991 | Steeby et al. | 74/335 |
| 5,123,513 | 6/1992 | Petrak | 192/86 |
| 5,222,581 | 6/1993 | Paulsen | 192/3.58 |
| 5,377,800 | 1/1995 | Sperduti et al. | 192/85 CA |
| 5,566,805 | 10/1996 | Sommer | 192/85 V |

*Primary Examiner*—Charles A. Marmor
*Assistant Examiner*—Sherry Lynn Estremsky
*Attorney, Agent, or Firm*—Oldham & Oldham Co., L.P.A.

[57] ABSTRACT

Anti-gear hopping device for a power transmission mechanism for an automotive vehicle. The power transmission mechanism may be a torque transfer case of a four wheel drive system. The anti-gear hopping device prevents undesired shifting between high range speed and low range speed modes of operation. The anti-gear hopping device comprises: (A) a fluid pressure mechanism for controlling the movements of a shift member; (B) a valve mechanism for actuating the fluid pressure mechanism; and (C) a valve actuator. The fluid pressure mechanism may include either a diaphragm or a piston which divides a chamber into two cavities which may be at different pressures. An output member linked to the diaphragm or piston controls shifting. The valve means is preferably a four way valve which includes first and second inlet ports in respective communication with the cavities of the fluid pressure actuator, and first and second outlet ports which are in respective communication with a source of fluid under higher pressure, say the atmosphere, and a source of fluid under lower pressure, said a vacuum source. The valve mechanism in a first state places a first outlet port and first cavity in communication therewith in communication with one of said fluid pressure sources, and simultaneously places the second inlet port and cavity in communication therewith in communication with the other source of fluid. In the second state, the respective communications are reversed so that the first inlet port is in communication with the second outlet port, and the second inlet port is in communication with the first inlet port. The valve mechanism further has a third state in which the first and second inlet ports are both closed, so that pressures previously established in the cavities are maintained. This prevents undesired shifting. Finally, the valve actuator means may comprise a three position switch which makes it possible to selectively place the valve mechanism in a desired one of the three states.

10 Claims, 6 Drawing Sheets

ANTI-GEAR-HOPPING DEVICE

BACKGROUND OF THE INVENTION

1. Field of the Invention

The present invention relates to an anti-gear-hopping device for a power transmission mechanism for an automotive vehicle, and, in particular, an anti-gear-hopping device which may be used in conjunction with a torque transfer case of a four-wheel drive system to prevent undesired shifting of the torque transfer case between high-range speed and low-range speed modes of operation.

2. Related Art

Four-wheel drive systems for vehicles typically include a torque transfer case which includes an input shaft connected to and driven by the output shaft of the vehicle main transmission, a rear output shaft connected to drive the rear wheels of the vehicle, a front output shaft connected to drive the front wheels of the vehicle, and means for drivingly connecting the input shaft to the front and rear output shafts. Conventional torque transfer cases typically include mechanisms for shifting between low and high speed range modes of operation, where the rear output shaft is directly connected to the input shaft during the high speed mode of operation and is connected to a planetary gear reduction set coupled to the input shaft during the low speed mode of operation. Known speed range shifting devices include asymmetric shift rails disposed within the torque transfer case and associated linkages and actuating means disposed externally to the case. Such systems are relatively expensive due to the linkages required and are at least partially exposed to the environment external of the transfer case. Another known shifting mechanism includes a shift sleeve collar mounted to the rear output shaft which is actuated by a linear screw arrangement coaxially disposed about the shift sleeve and driven by an electric motor. While this system eliminates the linkages of the aforementioned system, the included electric motor is relatively expensive and heavy.

A problem with power transmission mechanisms for automotive vehicles, including both transfer cases and transmissions having high and low speed ranges, is inadvertent and unwanted shifting, as, for example, unwanted downshifting from a high-speed range to a low-speed range. Various devices for overcoming this problem in transmissions having high-speed and low-speed ranges are known, but these, in general, are quite complex and frequently include mechanical linkages instead of relying on fluid pressure alone. The inventors are not aware of any devices for preventing unwanted gear hopping in torque transfer cases.

In view of the deficiencies associated with the foregoing range speed shifting mechanisms, applicant's invention is in herein presented.

SUMMARY OF THE INVENTION

The present invention is directed to an anti-gear-hopping device for a power transmission mechanism and, in particular, for a transfer case. This anti-gear-hopping device includes a housing defining an interior chamber having therein a moveable member, such as a diaphragm or a piston, which divides the interior chamber into first and second cavities which are hermetically sealed from each other.

An output member is attached to the moveable member for shifting the power transmission between a first position and a second position (which may be high and low positions, respectively).

This invention further includes a valve means for placing one of the cavities under a higher pressure while simultaneously placing the other cavity under a lower pressure thereby actuating the moveable member. An important feature of the present invention is that the valve means can be actuated between three states. In the first state, the first cavity is placed in fluid communication with a higher pressure fluid source while simultaneously the second cavity is placed in communication with a lower pressure fluid source. In the second state, the second cavity is placed in communication with a higher pressure fluid source and the first cavity is placed in communication with the lower pressure fluid source. Finally, in the third state, both the first and second cavities are simultaneously blocked from access to either the higher pressure source or the lower pressure source, so that the pressure previously established in each of the cavities is maintained, and undesired shifting is prevented.

Finally, a valve actuator is provided. This actuator is capable of placing the valve means selectively in any one of the three states as desired.

The present invention provides a simple device for preventing gear hopping in torque transfer cases and other power transmission mechanisms including dual-range transmissions. The present device is simple, effective, and relies entirely on fluid pressure for preventing gear hopping.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings wherein.

DETAILED DESCRIPTION OF THE DRAWINGS

Figure 1:
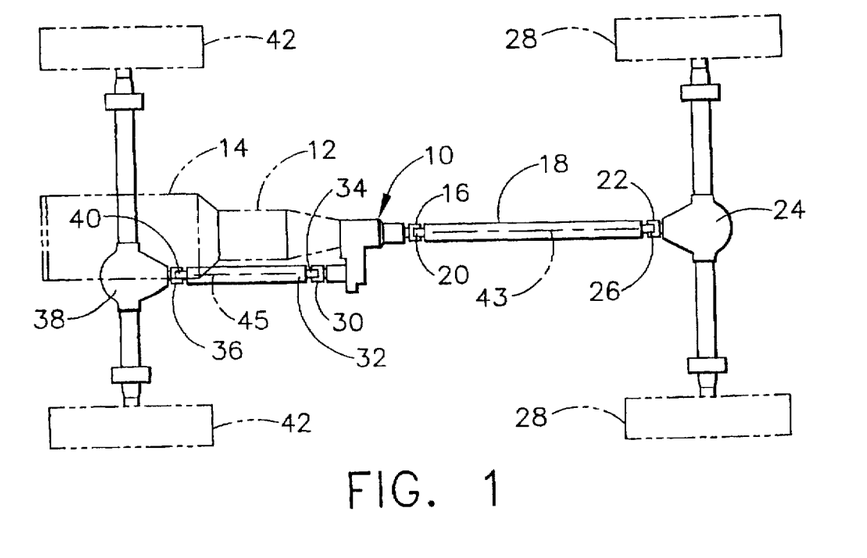
FIG. 1 is a plan view schematically illustrating the drivetrain components of a four-wheel drive vehicle including a torque transfer case which may incorporate a vacuum operated speed range shifting mechanism.

Referring now to the drawings, FIG. 1 schematically illustrates a four-wheel drive system which includes a power transmission mechanism, which is preferably a torque transfer case 10 which incorporates a vacuum operated speed range shifting mechanism (not shown in FIG. 1). As shown in FIG. 1, torque transfer case 10 is coupled with a conventional transmission unit 12 which in turn is coupled to a vehicle drive engine 14. Transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the rear drive shaft 18 between the rear wheels 28 of the vehicle.

Transfer case 10 is also provided with a front output shaft or yoke 30 which is drivingly connected to the rearward end of a vehicle front drive shaft 32 by means of a universal joint coupling 34. The front drive shaft 32 has a forward end connected to an input shaft or yoke 36 of a vehicle front differential unit 38 by means of a universal joint coupling 40 and is adapted to divide torque received from drive shaft 32 between the vehicle front wheels 42.

Figure 2:
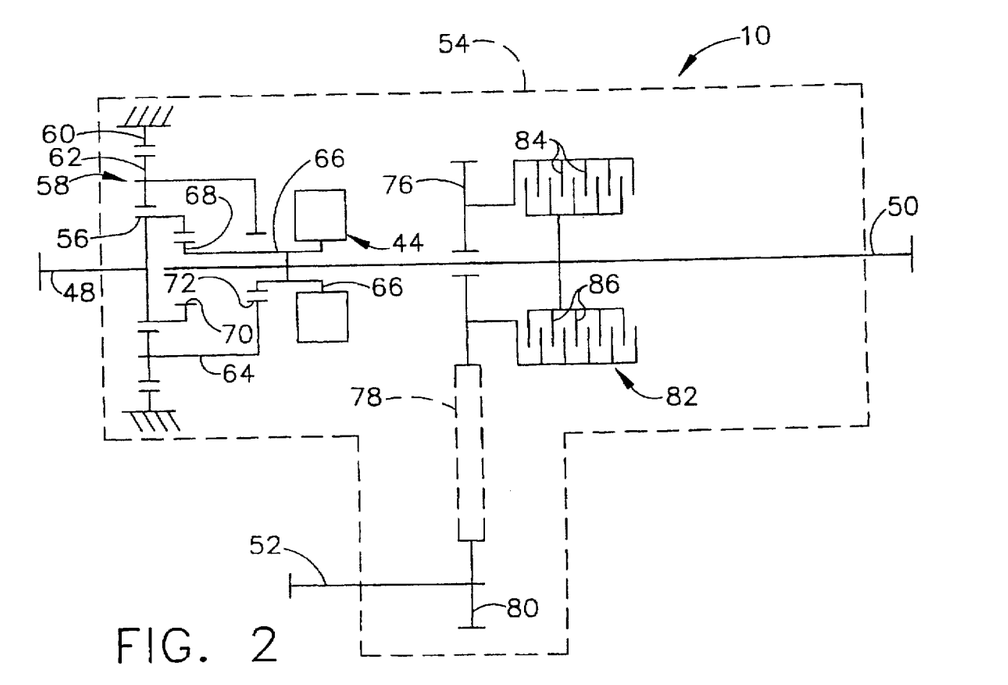
FIG. 2 is a view schematically illustrating the internal components of the torque transfer case shown in FIG. 1.
Figure 3:
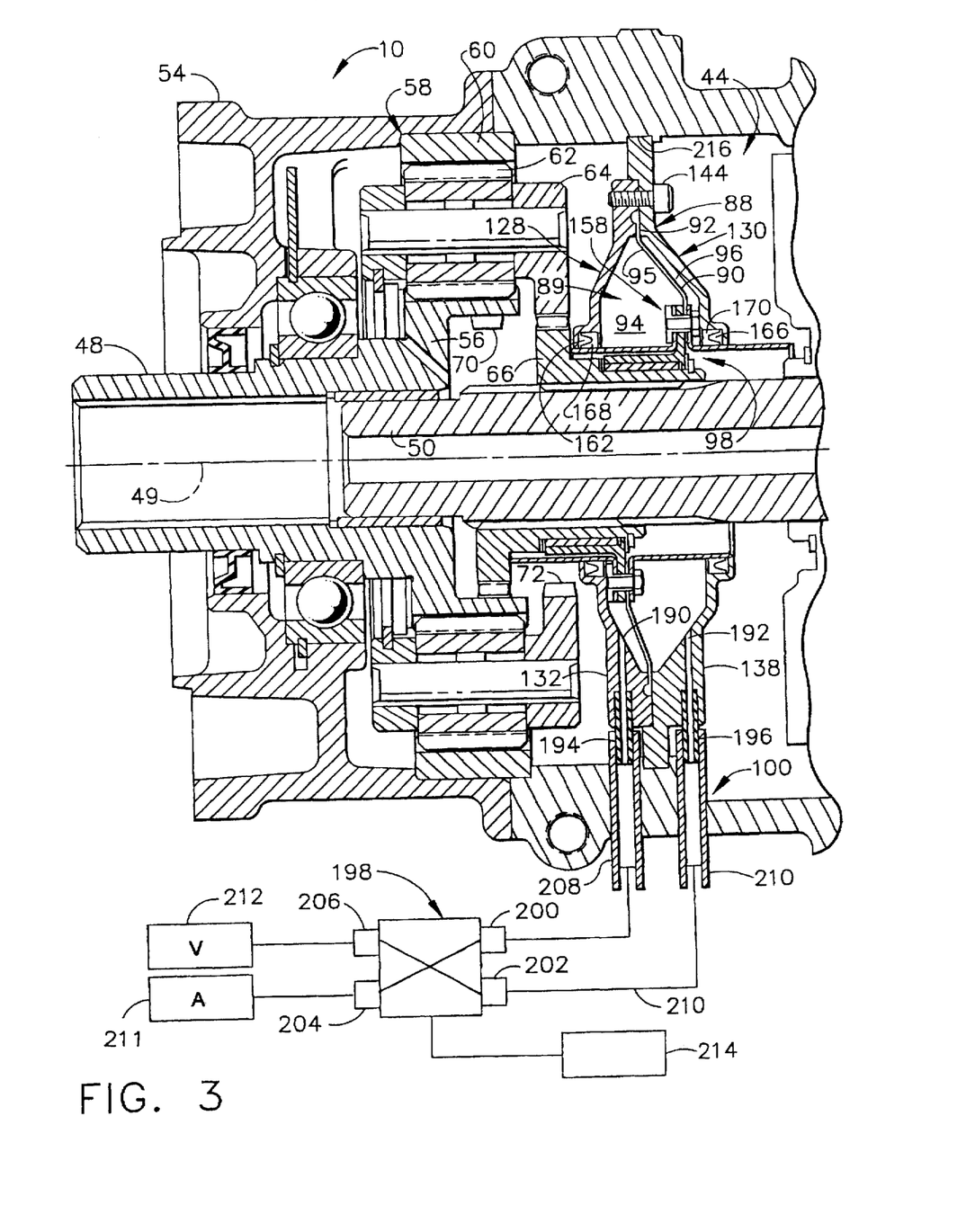
FIG. 3 is a partial longitudinal sectional view illustrating the torque transfer case schematically depicted in FIGS. 1 and 2, a vacuum operated speed range shirting mechanism, and an anti-gear hopping device according to this invention, in which a portion of the anti-gear hopping device is shown diagrammatically.

Referring now to FIGS. 2 and 3, there is shown a schematic diagram and partial sectional view of the internal components of the transfer case 10 of FIG. 1, which incorporates a vacuum operated speed range shifting mechanism, generally indicated at 44. The transfer case 10 includes an input shaft 48 coupled to the output shaft (not shown) of the vehicle transmission 12 (shown in FIG. 1), a rear output shaft 50 for connection to the vehicle rear drive shaft 18, and a front output shaft 52 for connection to the vehicle front drive shaft 32. The input shaft 48 rotates about a longitudinal centerline axis 49 and is rotatably supported at the forward end of a transfer case housing 54. Shaft 48 incorporates a sun gear 56 which forms part of a planetary gear reduction set, generally indicated at 58, used to achieve the low speed operating range. Planetary gear set 58 includes a ring gear 60 which is fixed relative to housing 54, and a plurality of circumferentially spaced planet gears 62 which are individually rotatably supported by planet carrier 64. Rear output shaft 50 is rotatable about axis 49 and extends forwardly into housing 54. The vacuum operated speed range shifting mechanism 44 includes an annular shift sleeve 66 which surrounds and is splined to the forward end of output shaft 50, and is therefore rotatable with shaft 50 about axis 49. Sleeve 66 includes external splines 68 for engagement with either internal splines 70 connected to the input shaft 48, or internal splines 72 connected to the planet carrier 64. When shift sleeve 66 is disposed in a first, forward axial position so as to be connected to the input shaft 48, as illustrated below axis 49 in FIG. 3, there is a direct drive connection between input shaft 48 and the rear output shaft 50 causing shaft 50 to rotate at a first, relatively high speed thereby defining the high speed range of operation of transfer case 10. When shift sleeve 66 is disposed in a second, axially aft position so as to be connected to planet carrier 64, as shown above axis 49 in FIG. 3, the planetary gear set 58 introduces a predetermined gear reduction causing output shaft 50 to rotate at a second relatively low speed thereby defining the low speed range of operation of transfer case 10.

Transfer case 10 includes the following conventional components, which do not form a part of the present invention, which may be used to distribute torque between the front and rear wheels of the vehicle as follows. The transfer case 10 further comprises a first drive sprocket 76 which is rotatably supported on a central portion of the rear output shaft 50 and is connected by a drive chain 78 to drive a second drive sprocket 80 which is rotatably multi-disc four-wheel drive clutch, generally indicated at 82, is provided to control torque input to the front output shaft 52, and includes a first group of clutch plates 84 which, while axially movable, are secured for rotation with the first drive sprocket 76. A second group of clutch plates 86 are secured for rotation with the rear output shaft 50, and are also axially movable. Four-wheel drive clutch 82 is actuated by conventional means (not shown) which may be used in conjunction with a microprocessor-based electronic control system (not shown). When clutch 82 is disengaged the vehicle is operated in a two-wheel drive mode, with all the driving torque directed to the rear wheels of the vehicle via output shaft 50, vehicle rear drive shaft 18 and rear differential 24. When clutch 82 is fully engaged, a direct drive connection is provided between rear output shaft 50 and front output shaft 52 so that torque is distributed to the front and rear wheels of the vehicle based upon the traction available at each wheel.

Figure 4:
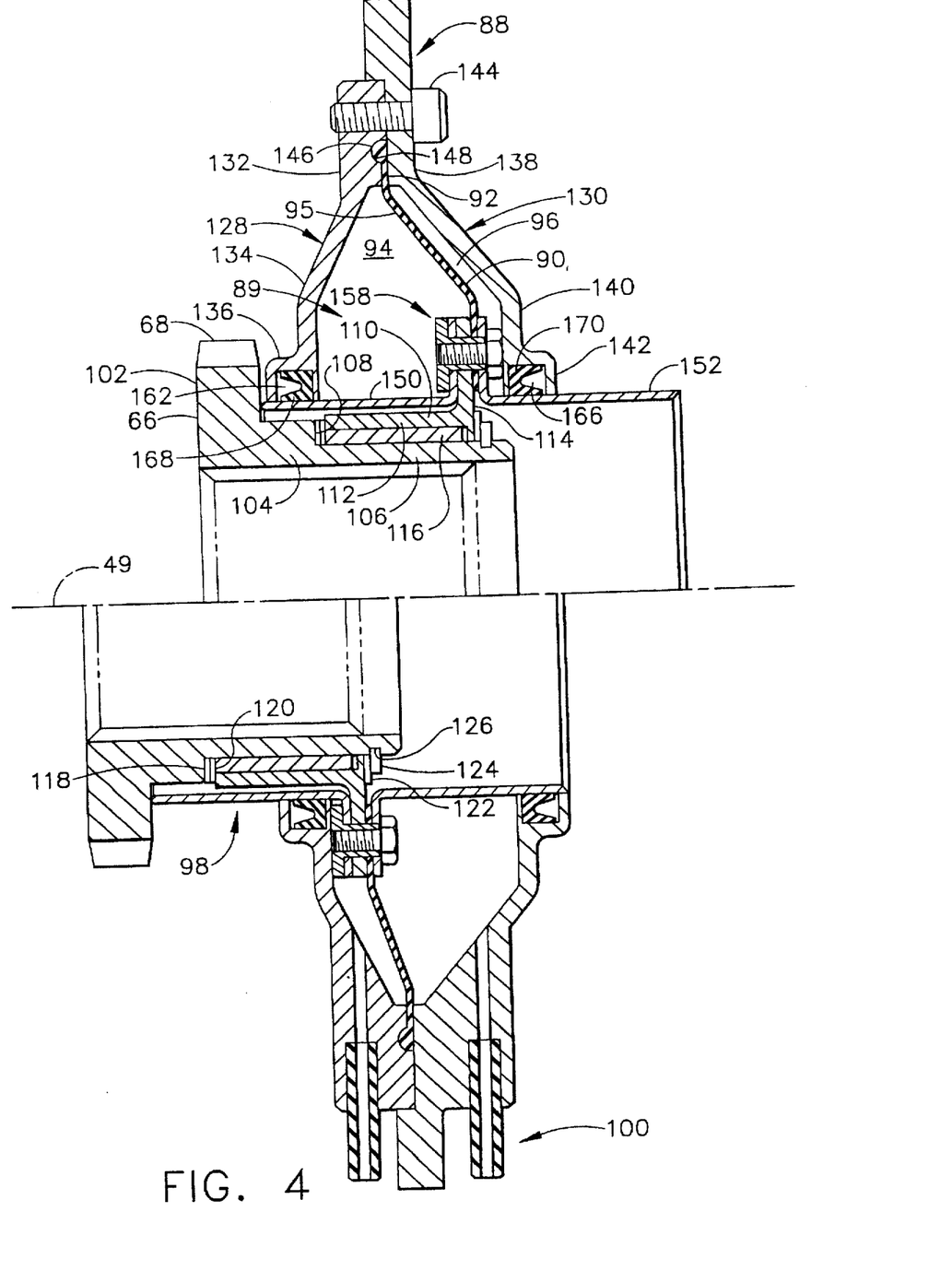
FIG. 4 is an enlarged longitudinal sectional view illustrating the vacuum operated speed range shifting mechanism shown in FIG. 3.
Figure 5:
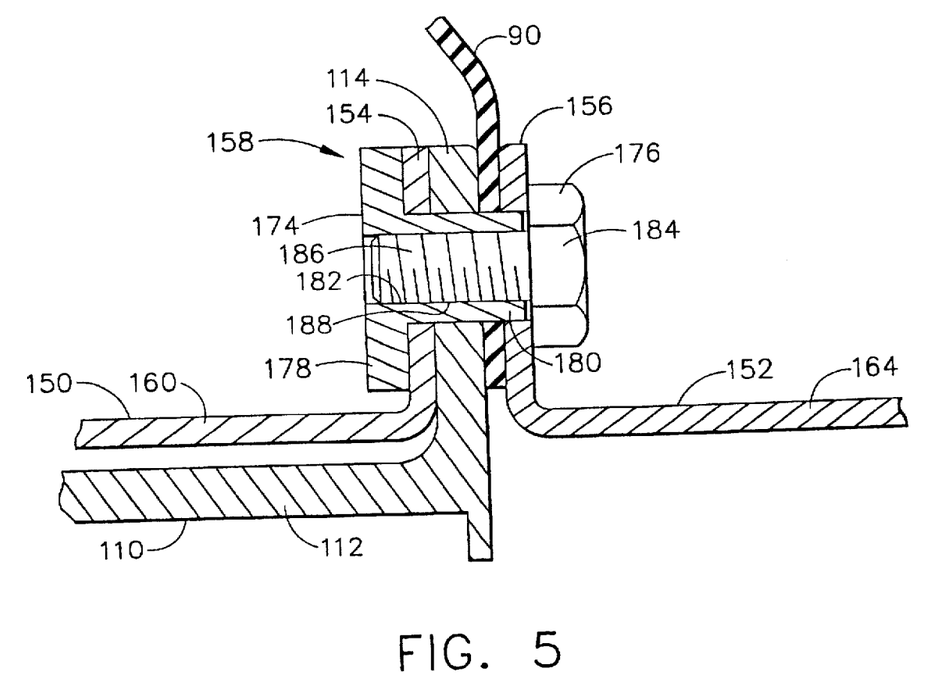
FIG. 5 is an enlarged view of illustrating a fastening means included in the speed range shifting mechanism of the present invention.

Referring now to FIGS. 3–5, the specific construction of the vacuum operated speed range shifting mechanism 44 is discussed in greater detail. In addition to shift sleeve 66, speed range shifting mechanism 44 further includes a non-rotatable annular housing 88 which is disposed coaxially about shift sleeve 66 within transfer case housing 54. Housing 88 is axially restrained by transfer case housing 54 and defines an interior chamber 89. Mechanism 44 further includes a moveable member, here shown as a flexible annular diaphragm 90 having an outer portion 92 attached to housing 88 and disposed within housing 88 so as to divide interior chamber 89 into first and second annular cavities 94 and 96, respectively. Cavities 94 and 96 are substantially hermetically sealed, as discussed subsequently in greater detail. A shift collar assembly, generally indicated at 98, is attached to diaphragm 90 and is disposed in surrounding relationship with shift sleeve 66. Mechanism 44 further includes a means, generally indicated at 100, for evacuating one of the cavities 94 and 96 and for simultaneously venting the other of cavities 94 and 96 to atmosphere. The pressure differential between cavities 94 and 96, and the resultant generally axial force acting on diaphragm 90, shift collar assembly 98 and other elements of mechanism 44 as subsequently described, results in sleeve 66 being disposed in one of the axial positions illustrated above and below axis 49 in FIGS. 3 and 4. Other arrangements to provide the pressure differential between cavities 94 and 96 are contemplated in the invention.

Shift sleeve 66 includes a radially extending flange portion 102 having external splines 68 formed on an outer end thereof Sleeve 66 further includes a first generally cylindrical portion 104 attached to and extending axially aftward from flange portion 102, and a second generally cylindrical portion 106 attached to and extending axially aftward from the first cylindrical portion 104. The diameter of cylindrical portion 104 is greater than the cylindrical portion 106 of sleeve 66. An annular, radially extending shoulder 108 is formed between cylindrical portions 104 and 106. Shift collar assembly 98 comprises an output member, here shown as a radially outward shift collar 110 having an axially extending, generally cylindrical portion 112 and a radially extending flange portion 114 attached to cylindrical portion 112. Shift collar assembly 98 further includes a radially inward and generally cylindrical bushing 116 which is pressed into the cylindrical portion 112 of shift collar 110, so as to engage shift collar 110 in an interference fit. The flange portion 114 of shift collar 110 is attached to diaphragm 90 as subsequently discussed in greater detail. Mechanism 44 further includes annular thrust bearings 118, 120 and 122 which are disposed in surrounding relationship with cylindrical portion 106 of sleeve 66. Mechanism 44 further comprises an annular snap ring 124 disposed in an annular groove 126 formed in cylindrical portion 106 of shift sleeve 66. Thrust bearings 118 and 120 are axially adjacent one another and are disposed axially between shoulder 108 of sleeve 66 and shift collar assembly 98. Thrust bearing 122 is disposed axially between snap ring 124 and shift collar assembly 98. Accordingly, shift collar assembly is disposed axially between thrust bearings 120 and 122.

Annular housing 88 comprises front and rear portions 128 and 130, respectively. Front portion 128 includes a radially outward flange 132 and a radially inwardly extending leg portion 134 which is attached to flange 132 and terminates in a radially inwardly facing U-shaped channel 136. Rear portion 130 of housing 88 includes a radially outward flange 138 and a radially inwardly extending leg portion 140 attached to flange 138 and terminating in a radially inwardly facing U-shaped channel 142. Flanges 132 and 138 are fastened to one another using conventional means such as bolts 144 (only one shown). The outer portion 92 of diaphragm 90 is disposed axially between flanges 132 and 138 and is therefore clamped between flanges 132 and 138 when bolts 144 are torqued. The outer portion 92 of diaphragm 90 terminates in an annular rib 146 which is disposed in an annular groove 148 formed in flange portion 132 of the front portion 128 of housing 88. Rib 146 is preferably bonded, using conventional adhesives, within groove 148 which further secures the position of outer portion 92 of diaphragm 90 between flanges 132 and 138.

The shifting mechanism 44 further comprises annular sealing sleeves 150 and 152 having flange portions 154 and 156, respectively, which are attached to the shift collar assembly 98 and diaphragm 90 using a fastening means generally indicated at 158. Sealing sleeve 150 further includes a cylindrical portion 160 which is disposed in surrounding relationship with the shift collar 110 and extends axially forward from flange 154 so as to cooperate with U-shaped channel 136 to form an axially forward, inner annular receptacle 162. Similarly, sealing sleeve 152 includes a cylindrical portion 164 which extends axially aftward from flange portion 156 so as to cooperate with U-shaped channel 142 to form an axially aftward, inner annular receptacle 166. Resilient, annular seals 168 and 170 are disposed in chambers 162 and 166, respectively. Seals 168 and 170 preferably have a V-shaped cross-section, as shown in FIG. 3, and are preferably made of elastomeric material. Seal 168 is disposed in sealing engagement with sealing sleeve 150 and the U-shaped channel 136 of front portion 128 of housing 88. Seal 170 is disposed in sealing engagement with sealing sleeve 152 and the U-shaped channel 142 of the rear portion 130 of housing 88. The outer surfaces of cylindrical portions 160 and 164 of sealing sleeves 150 and 152, respectively, are manufactured with very smooth surface finishes so as to enhance the sealing engagements with seals 168 and 170. The use of seals 168 and 170, in combination with the attachment of outer portion 92 of diaphragm 90 to flanges 132 and 138 and the attachment of diaphragm 90 to sealing sleeves 150 and 152 and shift collar 110, allow cavities 94 and 96 of housing 88 to be substantially hermetically sealed.

Referring now to FIG. 5, the manner in which diaphragm 90, shift collar 110 and sealing sleeves 150 and 152 are attached to one another using the fastening means 158, as well as the particular construction of fastening means 158 will be discussed in greater detail. In addition to fastening the aforementioned components together, the constituent elements of fastening means 158 serve the function of axial stops, in either a forward or aft direction, thereby limiting the axial travel of diaphragm 90, shift collar 110 and sealing sleeves 150 and 152. Fastening means 158 comprises a plurality of bushings 174 and a corresponding plurality of bolts 176, with the number of bushings 174 and bolts 176 being equal to one another. The number of bushings and bolts required are dependent upon the particular application and are anticipated to be in the range of 3 to 5. Although greater numbers of bushings and bolts are considered to be within the scope of the present invention, fewer numbers are not acceptable as this would compromise the ability to hermetically seal cavities 94 and 96. Each bushing 174 has a head portion 178 and a cylindrical portion 180 attached to head portion 178, with cylindrical portion 178 having internal threads 182. Each bolt 176 includes a head portion 184 and a shank portion 186 having external threads 188, with shank portion 186 being attached to head portion 184. The cylindrical portion 180 of each bushing is inserted into holes formed in flange 154 of sealing sleeve 150, flange 114 of shift collar 110, the inner portion of diaphragm 90, and flange 156 of sealing sleeve 152. The shank portion 186 of each bolt 176 threadingly engages the cylindrical portion 180 of a corresponding one of bushings 174. Bolts 176 are torqued so as to permit cavities 94 and 96 to be substantially hermetically sealed. The axial stopping function of fastening means 158 will be discussed further in conjunction with the discussion of the operation of mechanism 44.

The evacuating means 100 comprises a flow passage 190 extending radially through a locally enlarged portion of flange 132 of the front portion 128 of housing 88 with an inner end of flow passage 190 in fluid flow communication with cavity 94 within housing 88. Means 100 further includes a flow passage 192 which extends radially through a locally enlarged portion of flange 138 of the rear portion 130 of housing 88, with an inner end of passage 192 being in fluid flow communication with cavity 96. Flow passages 190 and 192 each include an enlarged diameter outer portion for receiving hollow flexible tubes 194 and 196, respectively. Tubes 194 and 196 are preferably made of plastic and are bonded, by conventional means, within the enlarged outer portions of passages 190 and 192, respectively.

Details of the vacuum operated speed range shirting mechanism 44 do not form part of the present invention. However, an anti-gear hopping device according to this invention does require certain parts of the speed range shifting mechanism 44, e.g., a housing (e.g. 88) which houses a moveable member (e.g., diagram 90) having cavities (94 and 96) on opposite sides of the moveable member, and an output member (e.g., 110) attached to the moveable member (90) for shifting a power transmission mechanism (e.g., 10) between a first and a second position according to this invention.

An anti-gear hopping device, further includes a valve means or mechanism indicated generally at 198, having inlet ports 200 and 202 and outlet ports 204 and 206, for controlling the supply of fluid at different pressures to cavities 94 and 96. Hollow tube 208 is fluidly coupled between flow passage 190 and valve means 198, with a first end of tube 208 being attached to flexible tube 194 and a second end of tube 208 being attached to inlet 200 of valve means 198. Similarly, tube 210 fluidly couples flow passage 192 and valve means (or valve mechanism) 198, with a first end of tube 210 being attached to flexible tube 196 and a second end of tube 210 being attached to inlet 202 of valve means 198. Outlet ports 204 and 206 are connected to a higher pressure fluid source 211 and a lower fluid pressure source 212, respectively. The preferred higher pressure source 211 is the atmosphere and the preferred lower source 212 is a source of vacuum. Alternatively, the higher pressure fluid source 211 may be a source of elevated pressure (e.g., compressed air) and the lower pressure fluid source 212 may be the atmosphere. Thus, in a preferred embodiment, outlet port 204 of valve means 198 is vented to the atmosphere surrounding transfer case 10 and outlet port 206 is fluidly coupled to a vehicle vacuum source 212. Valve means 198 may comprise a single four-way, electrically operated valve which is actuated by a three-position switch 214, as illustrated in FIG. 3, or alternatively, may comprise a pair of valves which are suitably configured, one being connected to each of the tubes 208 and 210.

When switch 214 is in a "low speed" position, valve means 198 is in a first state, inlet port 200 is fluidly coupled with outlet port 204 and inlet port 202 is fluidly coupled with outlet port 206. Accordingly, valve means 198 may operably fluidly couple flow passage 190 with the atmosphere surrounding transfer case 10, and may simultaneously fluidly couple flow passage 192 with vacuum source 212. In this manner, cavity 96 is substantially evacuated and cavity 94 is pressurized to atmospheric pressure. The differential pressure existing between cavities 94 and 96 results in an aftward, generally axial force acting on the shift collar assembly 98 as well as flanges 154 and 156 and the unrestrained central portion 95 of diaphragm 90.

When switch 214 is in the "high speed" position, valve means 198 is in a second state, inlet port 200 is fluidly coupled with outlet port 206 and inlet port 202 is fluidly coupled with outlet port 204. Accordingly, valve means 198 fluidly couples flow passage 192 with the atmosphere surrounding transfer case 10 and simultaneously fluidly couples flow passage 190 with the vacuum source 212. In this manner, cavity 94 is substantially evacuated while cavity 96 is simultaneously pressurized to atmospheric pressure. In this case, the differential pressure between cavities 96 and 94 results in a forward, generally axial force acting on the shift collar assembly 98 as well as flanges 154 and 156 and the unrestrained central portion 95 of diaphragm 90. Since diaphragm 90, shift collar 110, and sealing sleeves 150 and 152 are fastened to one another and since diaphragm 90 is relatively flexible, the aforementioned aftward and forward axial forces cause shift collar 110, sealing sleeves 150 and 152 and the inner portion of diaphragm 90 to translate to the corresponding one of the axial positions illustrated in FIGS. 3 and 4. Due to the interrelationship existing among shift sleeve 66, shift collar assembly 98, thrust bearings 118, 120 and 122, and snap ring 124, shift sleeve 66 is forced to translate with shift collar assembly 98 to either the forward or aft axial position illustrated in FIGS. 3 and 4. The radially outermost portion of flange 138 of rear portion 130 of housing 88 is disposed in an annular groove 216 formed in housing 54 of transfer case 10. The aforementioned axial forces also urge flange 138 against either the forward or aft sidewall of groove 216 thereby axially restraining housing 88 and reacting the aforementioned forces through housing 54. It should be understood, that the particular type of valve or valves used is unimportant provided that valve means 198 is capable of evacuating cavity 94 while simultaneously pressurizing cavity 96 to atmospheric pressure and additionally, is capable of evacuating cavity 96 while simultaneously pressurizing cavity 94 to atmospheric pressure.

According to this invention, valve means or mechanism 198 has a third or "hold" state in which inlet ports 200 and 202 are closed so that there is no communication between either cavity 94 or 96 with either vacuum source 212 or the atmosphere. Switch 214 is placed in a third or OFF position to achieve this state. This state can be achieved by closing outlet ports 204 and 206, or whichever of these outlet ports (e.g., 206) is in communication with a non-atmospheric pressure source (e.g., vacuum source 212, or a source of fluid under elevated pressure), or by closing both the inlet ports 200, 202 and the outlet ports 204, 206. Cavities 94 and 96 are also out of communication with each other in this state and indeed in all states of operation according to this invention. Also, to maintain vacuum in vaccuum source 212, outlet port 206 is closed so that there is no communication between vaccuum source 212 and the atmosphere. When valve means 198 is in this state, the fluid pressures previously established in cavities 194 and 96 are maintained. Consequently, diaphragm 90 maintains its previous position and shifting of the shifting mechanism 44 is prevented. Thus, this invention provides a simple mechanism which utilizes fluid to prevent undesired shifting or gear hopping. Alternatively, a pressure differential may be created between cavities 94 and 96 by pressurizing one of the cavities above atmospheric pressure while simultaneously venting the other cavity to atmosphere. In this instance, flow passages 190 and 192 may be fluidly coupled with valve means 198 such that one of the passages is connected to a source of pressure (say source 211), while the other is vented to atmosphere. It should be further understood that additional flow passages, similar to passage 190, may be formed radially through flange 132 and additional flow passages, similar to passage 192, may be formed radially through flange 138. In this instance, the plural flow passages would be fluidly coupled, or placed in fluid flow communication, with valve means 198 in such a manner to permit the evacuation or pressurization of one of cavities 94 and 96, while simultaneously venting the other of cavities 94 and 96 to atmospheric pressure.

The speed range shifting mechanism 44 may be either pneumatically or hydraulically operated. Pneumatically operated systems have been discussed above. If desired, air (for a pneumatic system) may be replaced by a suitable hydraulic fluid. A hydraulic system may include a source of vaccuum 212 connected to an outlet port (say 206) and a sump or reservoir 211, which is typically at atmospheric pressure, connected to the other outlet port (say 204). Alternatively, a hydraulic system may have a source 211 of hydraulic fluid under pressure, connected to one outlet port (204), and a sump or reservoir 212, connected to the other outlet port (206). In any case, the source and the sump are at different pressures.

Operation of the system shown diagrammatically in FIG. 3 will now be described. In operation, when a "low speed" mode of operation is desired, the vehicle operator selects the "low speed" position of switch 214. This results in flow passage 192 being fluidly coupled, through valve means 198, to vacuum source 212 which results in the evacuation of cavity 96. Flow passage 190 is simultaneously fluidly coupled, through valve means 198, to the atmosphere surrounding torque transfer case 10 which results in cavity 94 being pressurized to atmospheric pressure. Due to the pressure differential existing between cavities 94 and 96, shift collar 110 and sealing sleeves 150 and 152 and the inner portion of diaphragm 90 are translated axially aftward until the heads 184 of bolts 176 contact the rear portion 130 of housing 88. It is noted that the same result could be achieved by pressurizing cavity 94 to above atmosphere and simultaneously evacuating cavity 96 or venting cavity 96 to atmosphere. Due to the press fit between bushing 116 and shift collar 110, bushing 116 translates with shift collar 110.

When shift collar 110 is translated axially aftward, shift collar 110 forces thrust bearing 122 against snap ring 124, causing a corresponding aftward translation of shift sleeve 66 to the position illustrated above axis 49 in FIGS. 3 and 4. In this position, the external splines 68 of sleeve 66 engage the internal splines 72 formed on planet carrier 64, causing output shaft 50 to rotate at an angular speed which is reduced relative to that of input shaft 48.

When the "high speed" mode of operation is desired, the vehicle operator selects the "high speed" position of switch 214 causing flow passage 192 to be fluidly coupled with atmosphere while simultaneously causing flow passage 190 to be fluidly coupled with vacuum source 212. Accordingly, cavity 94 is substantially evacuated while cavity 96 is vented to atmospheric pressure. Due to the pressure differential existing between cavities 96 and 94 the inner portion of diaphragm 90, shift collar 110 and sealing sleeves 150 and 152 are translated axially forward until the head portions 178 of bushings 174 contact the forward portion 128 of housing 88. It is noted that the same result may be achieved by venting cavity 94 to atmosphere while simultaneously pressurizing cavity 96 to a pressure above atmospheric pressure. The forward translation of shift collar 110 and bushing 116 causes collar 110 and bushing 116 to be in contacting engagement with thrust bearing 120 and forces thrust bearing 118 against shoulder 108 of sleeve 66, causing a corresponding axially forward translation of sleeve 66 to the position illustrated below axis 49 in FIGS. 3 and 4. In this position, the external splines 68 of sleeve 66 engage the internal splines 70 formed on input shaft 48, thereby providing a direct drive connection between shafts 48 and 50 which rotate at the same speed.

Figure 6:
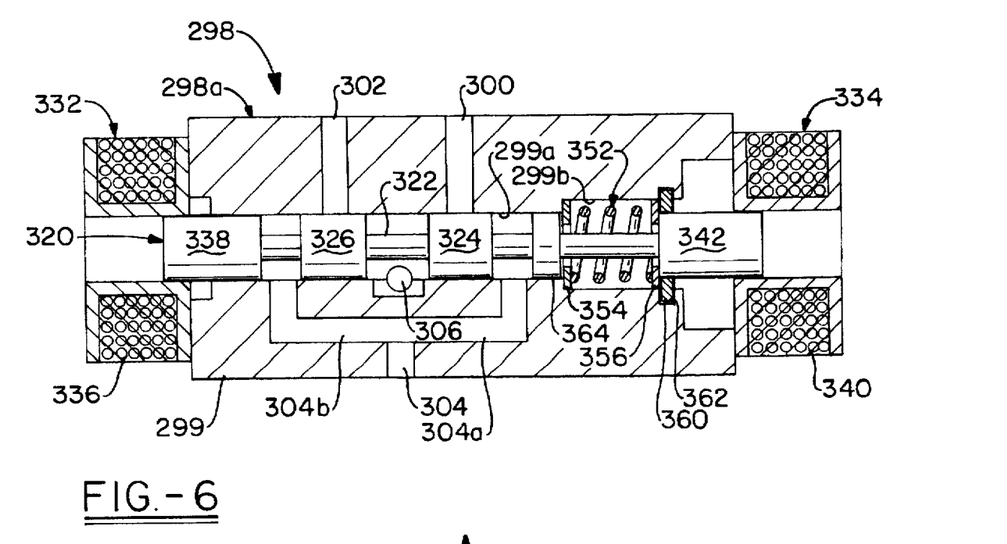
FIG. 6 is a longitudinal sectional view of a valve means for an anti-gear hopping device according to a first and preferred embodiment of the invention, wherein the valve means of this embodiment includes a self-centering spool valve which is moveable between left, right, and center positions.

A preferred valve means or mechanism for an anti-gear hopping device of this invention will now be described with reference to FIG. 6. Referring now to FIG. 6, the preferred valve means 298 comprises of self-centering spool valve 298a, which has generally cylindrical valve body 299 and a longitudinally (or axially) extending bore 299a and a counterbore 229b (to be discussed later) in valve body 299.

A pair of inlet ports 300 and 302, and a pair of outlet ports 304 and 306, extend inwardly from an external surface (which is preferably an outer circumferential surface) of valve body 299. Outlet port 304 has a pair of branches 304a and 304b. Outlet port 306 intersects bore 299a at the longitudinal mid-point (or other central location) thereof. Inlet ports 300 and 302, which may be designated as first and second inlet ports, or as "high" (HI) and "low" (LO) inlet ports, respectively, intersect port 299a at axially spaced points which are equidistant from and on opposite sides of the longitudinal mid-point of bore 299a (i.e., equally distantly spaced from the point of intersection of outlet port 306 with bore 299a). Outlet port branches port 304a and 304b intersect bore 299a at axially spaced points, which are equal distance from and on opposite sides of the longitudinal mid-point of bore 299a, and are also axially offset (typically outwardly as shown in FIG. 6) from the respective points of intersection of inlet ports 300 and 302 with bore 299a. In a preferred embodiment, inlet ports 300 and 302 are in communication with cavities 94 and 96 (shown in FIG. 3), respectively; outlet port 306 communicates with a source 212 of vacuum (more broadly with a source of lower pressure fluid), and outlet port 304 communicates with the atmosphere or a sump or reservoir (i.e., with a source 211 of higher pressure fluid). Alternatively, especially when a source of elevated pressure 211 is used instead of a vacuum source 212, the external connections of the outlet ports may be reversed so that the unbranched outlet port 306 communicates with a source 211 of fluid under pressure, and the branched port 304 communicates with the lower pressure fluid source 212, i.e., the atmosphere or a sump or reservoir. When the external connections of the outlet ports 304 and 306 are reversed, the external connections of the inlet ports 300 and 302 must also be reversed so that the diaphragm 90 and shifting mechanism 44 will be moved in the desired direction.

Spool valve 298a further comprises a longitudinally reciprocal spool assembly 320, which in turn includes a rod or stem 322 having a pair of spaced valve heads 324 and 326 fixably mounted thereon. Valve heads 324 and 326 engage the wall of bore 299a in a fluid tight manner, which may be achieved with the aid of sealing rings not shown. The space in between valve heads 324 and 326 is essentially the same as the spacing in between conduits 300 and 302.

A preferred valve actuator system (or means) for a spool assembly 320 is also shown in FIG. 6.

The preferred valve actuator system comprises a pair of solenoids 332 and 334, which are located at opposite ends, i.e., the left and the right end, respectively, of valve body 299. First solenoid 332 comprises a first annular coil 336 and a first magnetic spool or cord 338, which is affixed to a first end (i.e., the left end) of rod 322 so that is reciprocable therewith. Similarly, second solenoid 334 comprises a second annular coil 340 and a second magnetic spool or cord 342 which is affixed to a second end (i.e., the right end) or rod 322. Both coils 336 and 340 are connected through wiring (not shown) to a power source (not shown) and a switch (not shown) for selectively energizing coils 336 and 340. The switch may be a three-way (or double-pole) switch which enables a user to energize either coil 336 or 340, or neither, as desired.

Spool valve 320 is reciprocable between a first or left position and a second or right position. These correspond to the first and second states, respectively, of valve means 198 previously described. To move spool valve 320 to the left, solenoid 332 is energized (and simultaneously solenoid 334 is not energized). When spool 320 is in its first or left-hand position, outlet branch port 304b is blocked, inlet port 300 is in communication with outlet port 304 (via branch 304a) and the atmosphere (211), and inlet port 302 is in communication with outlet port 306 and vacuum source 212. This evacuates cavity 94 while cavity 96 is at atmospheric pressure, placing range shifting mechanism 44 in "lo speed" position. When spool assembly 320 is in a second or right-hand position, outlet branch port 304a is blocked, inlet port 300 is in communication with outlet port 306 and vacuum source 212, and inlet port 302 is vented to the atmosphere (211) via outlet conduit 304 and outlet port 304 and branch port 304b. This evacuates cavity 96 while cavity 94 is at atmospheric pressure, placing range Spool valve 320 also has a third or centered position, shown in FIG. 6, which corresponds to the third state of valve means 198 previously described. This third or centered position is between the first and second (or left and right) positions previously described, so that the spool assembly 320 must pass through the third or centered position when going from either the first (or left) to the second (or right) position or vice versa. When spool valve 320 or when spool assembly 320 is centered, both inlet ports 300 and 302 are closed or blocked, by valve heads 324 and 326, respectively. As a result, the pressures previously established in inlet ports 300 and 302 and in cavities 94 and 96 are maintained, preventing the shifting of shift mechanism 44. Outlet port 306 and vacuum source 212 are also blocked so that no fluid flow from the atmosphere (by outlet port 304) to the vacuum source 212 (via outlet port 306) takes place.

The valve actuator system of the embodiment of the invention shown in FIG. 6 further comprises a centering mechanism or centering spool assembly 320, i.e., moving it to the centered position shown in FIG. 6, when neither solenoid (332 or 334) is energized. This centering mechanism is located toward the right end of valve body 299 and comprises a compression spring 352 which is received between two annular disk-like spring containers 354 and 356. Centering spring 352 and spring retainers 354 and 356 are received in a counter-bore 299b, which is coaxial with and of slightly larger diameter than that of bore 299a, providing a shoulder 358, which limits axial movement of spring retainer 354 to the left. A snap ring 360, which is received in recess 362, limits axial movement of spring retainer 356 to the right. The centering mechanism further includes an abutment member 364, which is fixedly mounted on stem 322 between valve head 324 and spool 342, so that its reciprocable with stem 322. This abutment member 364 engages spring retainer 354 and thereby compresses spring 352 whenever the spool assembly 320 moves to the right. Spool 342 engages spring retainer 356, thereby compressing spring 352, whenever spool assembly 320 moves to the left. Thus, movement of spool assembly 320 in either direction (left or right) from the centered position shown in FIG. 6 is against the bias of centering spring 352.

The apparatus shown in FIG. 6 is in the centered position shown in FIG. 6 when neither solenoid (332 or 334) is energized. When solenoid 332 is energized, spool assembly 320 moves to the left, placing inlet port 300 and cavity 94 in communication with outlet port 304 and the atmosphere (211), and placing inlet port 302 and cavity 96 in communication with outlet port 306 and vacuum source 212. Also, as spool assembly 320 moves to the left, spool 342 engages spring retainer 356, moving it to the left and compressing spring 352. Conversely, when solenoid 334 is energized, spool assembly 320 moves to the right, placing inlet port 300 and cavity 94 in communication with outlet port 306 and vacuum source 212, and placing inlet port 302 and cavity 96 in communication with outlet port 304 and the atmosphere. Abutment member 364 engages spring retainer 354, moving it to the right and compressing spring 352. When neither solenoid is energized, spool assembly 320 returns to the centered position shown in FIG. 6 under the bias of spring 352.

Either air (or other gas) or hydraulic fluid can be the motive fluid in the apparatus shown in FIG. 6. When a hydraulic fluid is used, outlet port 304 is typically connected to a sump or reservoir.

Vacuum source 212 can be replaced by a source of fluid under pressure as previously noted if desired. The source of fluid under pressure can be connected to either outlet conduit 304 or outlet conduit 306. If the source of fluid under pressure is connected to outlet conduit 306, it is necessary to reverse the inlet conduit connections 300 and 302 so that the direction of movement of diaphragm 90 remains the same.

Figure 7:
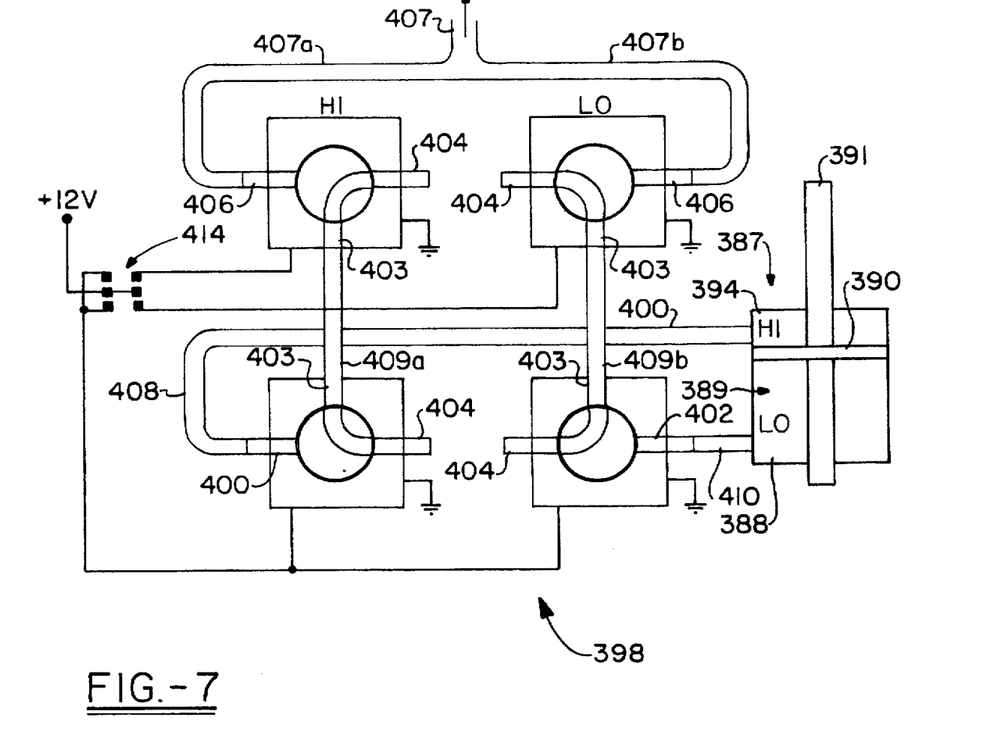
FIGS. 7, 8, and 9 are diagrammatic illustrations of an anti-gear hopping device according to a second embodiment of this invention, showing in separate figures each of the three states of the device.
Figure 8:
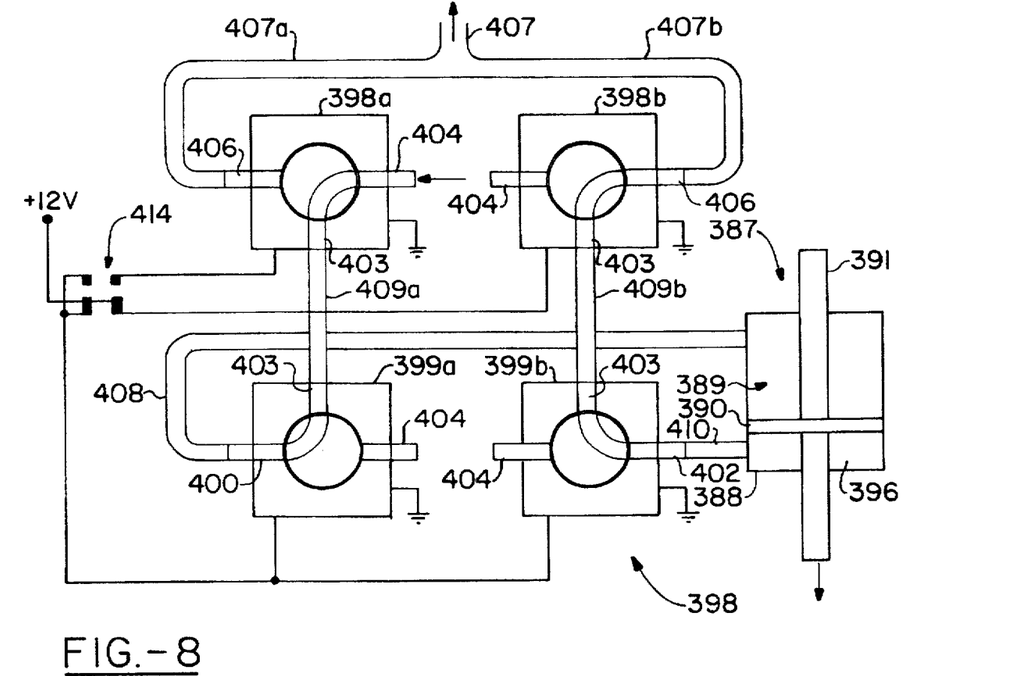
Figure 9:
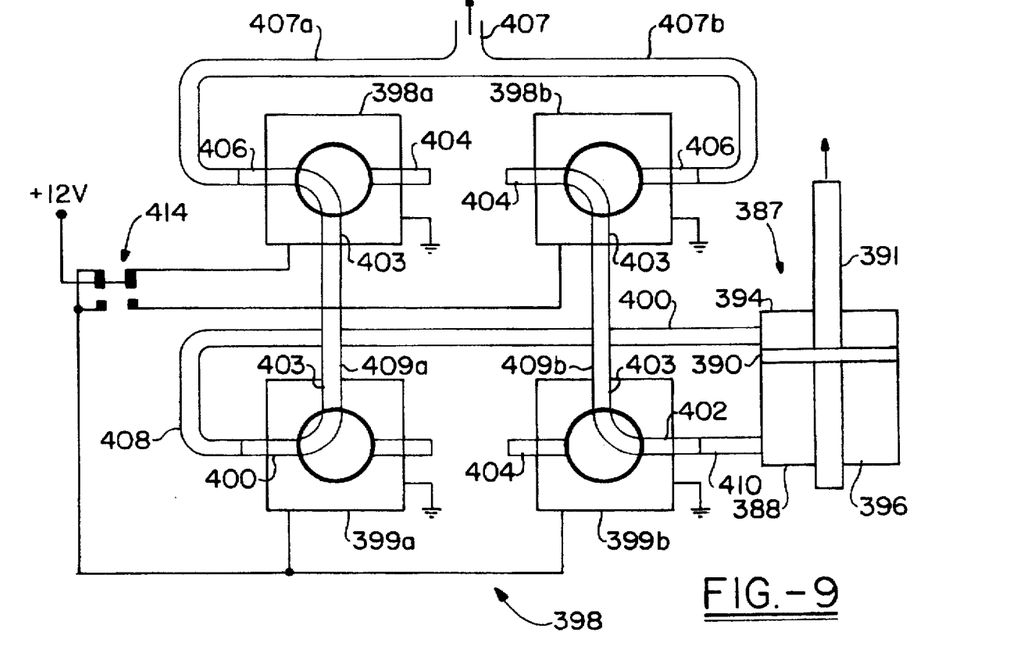

A second embodiment of this invention is shown in FIGS. 7-9. Referring now to FIGS. 7-9, a piston actuator may be used in place of the diaphragm actuator (which includes diaphragm 90) shown in FIG. 3. A fluid pressure mechanism (or piston actuator) 387 includes a housing 388 which defines an interior chamber 389, and a piston 390 which reciprocates in chamber 389. Piston 390 has an output shaft 391 which may be linked to a shift collar assembly (shown in FIG. 3) for actuating the speed range shifting mechanism 44. Piston 390 is in sealing engagement with the wall of housing 388 and divides the interior chamber 389 in the first and second cavities 394 and 396, respectively.

A valve means (or valve mechanism) 398, also shown in FIGS. 7-9, controls the movements of piston 390. Valve means 398 comprises four three-way, two-position valves 398a, 398b, 399a and 399b. While these valves have been shown as rotary valves, it will be apparent that other types of three-way, two-position can be used.

Valves 399a and 399b have inlet ports 400 and 402, respectively, for communication with cavities 394 and 396, respectively. Each of the valves 399a and 399b also has an internal communication port 403 for providing internal communication within the valve means 398 between valves 398a and 399a, and between 398b and 399b. Each of the valves 399a and 399b also has a vent 404 for venting fluid (e.g., either air or hydraulic fluid) to the atmosphere (or to a sump or reservoir in the case of hydraulic fluid). Valves 399a and 399b may be designated as inlet valves or as "HOLD" valves.

Each of the valves 398a and 398b has an internal communication port 403, an outlet port 406 which provides communication with a source of vacuum 212 (FIG. 3), and a vent 404 to atmosphere (or to a sump or reservoir). Valve 398a and 398b may be termed outlet valves. Alternatively, valve 398a may be referred to as a HI valve (actuation of this valve controls the shift to "high speed" or HI sequence), and valve 398b may be referred to as the LO valve (actuation of this valve controls the shift to "low speed" sequence).

Communication between outlet ports 406 and valves 398a and 398b and vacuum source 212 is provided by an external conduit 407, which has branch conduits 407a and 407b connected to valves 398a and 398b, respectively.

An internal passageway 409a connects respective internal communication ports 403 of valves 398a and 399a. Similarly, a second internal passageway 409b connects the respective internal communication ports 403 of valves 398b and 399b.

An external conduit 408 provides communication between cavity 394 and inlet port 400 of valve 399a. Similarly, an internal conduit 410 provides communication between cavity 396 and inlet port 402 of valve 399b. These internal conduits may be flexible hollow tubes.

The valve means 398 is electrically operated. Each valve 398a, 398b, 399a and 399b is movable between a first or active position in which its internal communication port 403 and the internal communication tube 409a or 409b connected thereto is placed in communication with an inlet port 400 or 402 (in valve 399a and 399b, respectively) or an outlet port 406 (in valves 398a and 398b, and a second or inactive position in which the internal communication port 403 is vented by a vent 404.

The electric system for operating valves 398a, 398b, 399a and 399b includes a three-position switch, which may be a double-pole, double-throw switch 414. This switch includes a high (HI) position, a low (LO) position and a neutral or "off" position, which is between the HI and LO positions. Switch 414 is connected to a power supply. This power supply is typically a 12 volt power supply provided by a vehicle battery. The electrical system further includes a separate circuit and a separate ground for each valve.

FIG. 7 illustrates the system of the second embodiment in a "hold sequence" or third state. This state occurs when switch 414 is in the OFF position as shown, or when the vehicle is not in operation. All valves (398a, 398b, 398c and 398d) are in the "switch off" or vented (or second) position.

This closes the inlet ports 400 and 402 so the communication between both cavities 394 and 396 and either vacuum source 212 (via conduit 407) or the atmosphere (via vent 404) is blocked. Communication between the vacuum source 212 (via conduit 407) and the atmosphere is also blocked. As a consequence; the pressures previously established in cavities 394 and 396 are maintained, so that piston 390 does not move instead, piston 390 remains in its last previous position which it held at the time of de-energization. This prevents undesired shifting of shift mechanism 44.

A three-position switch 414, connected to a power source (e.g., 12 volt) selectively energizes and de-energizes valves 398a, 398b, 399a and 399b. Switch 414 has a HI position, a LO position and an OFF position and may be a double-pull, double-throw switch as shown.

FIG. 7 shows the state of the system when it is not energized. This can occur when the vehicle is not in operation, or when the switch 414 is in the OFF position.

When the system is not energized, all of the valves 398, 398a, 398b, 399a, 399b forming a part of valve means 398 are in the vented (or second) position. In this position internal port 403 and vent port 404 in each valve are in communication so that internal passageways 409a and 409b are vented to the atmosphere. When the valves are in this position, inlet ports 400 and 402 are also closed. As a result, pressures previously established in cavities 394 and 396 are maintained, and the piston 390 remains in its last previous position which it held at the time of system de-energization. Normally, the piston 390 in this state will be at one end or the other of its travel (either at the top of its stroke as shown in FIGS. 7 and 9 or at the bottom of its stroke as shown in FIG. 8), and shift sleeve 66 (FIG. 3) will be either in its forward (high speed) or aft (low speed) position and will be held in that position by fluid pressure in cavity 394 or 396 as the case may be. FIG. 7 illustrates the third state of valve means 398 (or 198) described earlier.

FIG. 8 illustrates the state of the system for "low speed" operation (the second state of valve means 198 or 398 as described earlier). In this state, all moving parts, i.e., switch 414, all of the valves forming part of valve means 398 (i.e., valves 398a, 398b, 399a, and 399b), and piston 390, are in the position shown in FIG. 8. Switch 414 is in the LO position. Valves 398b (LO), and 399a and 399b (HOLD) are in the energized or "switched on" position, and valve 398a (HI) are in the de-energized or "switched off". In this position, cavity 396 is placed in communication with source of vacuum 212 (FIG. 3) via conduit 410, internal passageway 409b, and passage 407. Simultaneously, cavity 394 is in communication with the atmosphere via conduit 408, internal passageway 409a and vent 404 in HI valve 398a. As a result of the higher pressure in cavity 394, piston 390 is in its lower most position and shift sleeve collar 66 (FIG. 3) is in the aft (low speed) position.

FIG. 9 illustrates the system in its "high speed" position. All moving parts, i.e., switch 414, valves 398a, 398b, 399a, and 399b, and piston 390 are in the positions shown in FIG. 9. In this position, switch 414 is in its HI position. HI valve 398a, and HOLD valves 399a and 399b are in their energized or "on" positions, and valve 398b (LO) is in the de-energized or "switch off" position. Piston 390 is at the upper end of its travel as a result of higher pressure in cavity 396. Cavity 394 is in communication with source of vacuum 212 (FIG. 3) via conduit 408, internal passageway 409a and passage 407a. Simultaneously, cavity 396 is vented to atmosphere via conduit 410, internal passageway 409b and vent 404 in valve 398b.

Operation of the system shown in FIGS. 7-9 will now be described. First, a shift to LO sequence from the "off" or "HOLD" state (shown in FIG. 7) will be described with reference to FIG. 8. To shift to "LO speed" operation, the vehicle operator places switch 414 in the LO position shown in FIG. 8. This energizes valves 398b, 399a and 399b, but not valve 398a, placing valves 398b, 399a and 399b in the energized or "switched on" positions shown in FIG. 8, while 398a remains in the vented or "switch off" position, also shown in FIG. 8. As a result, cavity 396, now in communication with source of vacuum 212, is evacuated, while cavity 394 is vented to atmosphere. The higher pressure in cavity 394 causes piston 390 to travel downwardly as shown by the arrow to the lowermost position of its stroke, shown in FIG. 8. This moves the shift collar 66 (FIG. 3) to its aft ("low speed") position. The low speed sequence described is the same, whether the system was previously in its "off" or "high speed" position, since switch 414 must always go through the OFF position when it is moved from either the HI to the LO position or vise versa.

Now assume that the vehicle operator wishes to maintain the shift collar 66 in its "lo speed" position and to avoid the possibility of inadvertent shifting. Once the shift to low speed position has been made, the vehicle operator at any time can move the switch 414 to the OFF position shown in FIG. 7. This closes off inlet ports 400 and 402 and valves 399a and 399b, respectively, as shown in FIG. 7, so that the pressures previously established in cavities 394 and 396 are maintained. The higher fluid pressure in cavity 394 holds the piston 390 and shaft 391 in their lower most positions, as shown in FIG. 8, so that the shift collar 66 is maintained in the aft position by the force of fluid pressure in cavity 394.

To shift to "hi speed" operation (shown in FIG. 9) from either "lo speed" operation shown in FIG. 8 or the "OFF" position shown in FIG. 7, switch 414 is moved to the HI position shown in FIG. 8 or the "OFF" position shown in FIG. 7, switch 414 is moved to the HI position shown in FIG. 9. This causes all valves 398a, 398b, 399a and 399b to assume the position shown in FIG. 9. HI valve 398a and HOLD valve 399a and 399b are in the energized position, and LO valve 398b is in the vented or deenergized or "OFF" position. As a result, cavity 394, now in communication with source of vacuum 212, is evacuated, while cavity 396 is vented to atmosphere. The higher pressure in cavity 396 causes piston 390 to travel upwardly as shown by the arrow to the uppermost position of its stroke, shown in FIG. 9. This moves the shift collar 66 (FIG. 3) to its forward ("high speed") position. The high speed sequence described is the same whether the system was previously in its "OFF" or "high speed" position, since switch 414 must always go through the "OFF" position when it is moved from either HI or LO position or vise versa.

This invention provides a simple system for preventing inadvertent shifting of a power transmission mechanism, such as a transfer case, which has a plurality of speed ranges.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, the speed range shifting mechanism of the present invention may be utilized in torque transfer cases which are configured differently than the one illustrated in FIGS. 2 and 3. Additionally, the speed range shifting mechanism of the present invention may be utilized in transmissions or two-speed axles. The invention is therefore is not limited to specific preferred embodiments as described but is only limited as defined by the following claims.

What is claimed is:

1. An anti-gear hopping device for a power transmission mechanism, said anti-gear hopping device comprising:

(a) a housing defining an interior chamber;

(b) a moveable member which divides said interior chamber into first and second cavities which are sealed from each other;

(c) an output member attached to said moveable member for shifting said power transmission mechanism between a first position and a second position;

(d) valve means for establishing a pressure differential between said cavities by placing one of said cavities under a higher pressure while simultaneously placing the other cavity under a lower pressure, thereby actuating said moveable member;

said valve means being actuable between:

(1) a first state in which a first cavity is placed in fluid communication with a higher pressured fluid and a second cavity is placed in communication with a lower pressure fluid;

(2) a second state in which said second cavity is placed in communication with said higher pressure fluid source and said first cavity is placed in communication with said lower pressure fluid source; and (3) a third state in which said first and second cavities are simultaneously blocked from access from either said higher pressure fluid source or said lower pressure fluid source, whereby pressure previously established in said first and said second cavities is maintained and undesired shifting is prevented; and (e) valve actuator means for placing said valve means in a desired state.

2. An anti-gear hopping device according to claim 1, in which said power transmission mechanism is a transfer case.

3. An anti-gear hopping device according to claim 2, in which said transfer case has a high speed range and a low speed range and includes a speed range shifting mechanism.

4. An anti-gear hopping device according to claim 1, in which said valve means is electrically operated.

5. An anti-gear hopping device according to claim 1, in which said source of lower pressure fluid is a source of vacuum and said source of higher pressure fluid is the atmosphere.

6. An anti-gear hopping device according to claim 1, wherein said higher pressure fluid source is a source of fluid under elevated pressure and said source of lower pressure fluid is the atmosphere.

7. An anti-gear hopping device according to claim 1, in which said valve means includes a pair of inlet ports in communication with respective cavities, and a pair of outlet ports, one of which is in communication with said higher pressure fluid source and the other of which is in communication with said lower pressure fluid source.

8. An anti-gear hopping device according to claim 7;

in which said valve means comprises a self centering spool valve having a valve body, and a longitudinally extending bore in said body;

wherein further said inlet ports intersect said bore at axially spaced points of intersection, one of said outlet ports comprises a pair of branches which intersect said bore at spaced locations which are in proximity with but axially offset from respective points of intersection with said bore, and the other of said outlet ports intersects said bore between the points of intersection of said inlet ports of said bore;

wherein said valve means further comprises a spool assembly reciprocable in said bore, said spool comprising a longitudinally extending stem having a pair of spaced valve heads mounted thereon, and spools at opposite ends of said stem, said spool being reciprocable between a first position, a second position, and a centered position which is between said first and second position;

said spool in said first position placing one of said inlet ports in communication with said one of said outlet ports and the other inlet port in communication with said other outlet port;

said spool in said second position placing one of said inlet ports in communication with said other outlet port and said other inlet port in communication with said one of said outlet ports, said spool in said centered position closing both of said inlet ports so that pressures previously established in said cavities are maintained and shifting is prevented;

and wherein further said valve actuator means comprises a pair of solenoids at opposite ends of said valve body for selectively moving said spool assembly to one of said first and second positions; and wherein said valve means further includes biasing means for returning said spool assembly to centered position when neither of said solenoids is energized.

9. An anti-gear hopping device according to claim 1, wherein said moveable member is a diaphragm.

10. An anti-gear hopping device according to claim 1, wherein said moveable member is a piston.

* * * * *